(12) United States Patent
LaDuke et al.

(10) Patent No.: US 11,314,086 B2
(45) Date of Patent: *Apr. 26, 2022

(54) PANORAMIC, MULTIPLANE, AND TRANSPARENT COLLIMATED DISPLAY SYSTEM

(71) Applicant: DISNEY ENTERPRISES, INC., Burbank, CA (US)

(72) Inventors: Thomas F. LaDuke, Orange, CA (US); Mark A. Reichow, Valencia, CA (US)

(73) Assignee: Disney Enterprises, Inc., Burbank, CA (US)

( * ) Notice: Subject to any disclaimer, the term of this patent is extended or adjusted under 35 U.S.C. 154(b) by 239 days.

This patent is subject to a terminal disclaimer.

(21) Appl. No.: 16/856,967

(22) Filed: Apr. 23, 2020

(65) Prior Publication Data

US 2020/0257117 A1    Aug. 13, 2020

Related U.S. Application Data

(63) Continuation of application No. 16/117,196, filed on Aug. 30, 2018, now Pat. No. 10,663,724.

(51) Int. Cl.
*G02B 27/14* (2006.01)
*G02B 27/01* (2006.01)
*G02B 30/26* (2020.01)

(52) U.S. Cl.
CPC ......... *G02B 27/0101* (2013.01); *G02B 30/26* (2020.01); *G02B 2027/013* (2013.01)

(58) Field of Classification Search
CPC ............... G02B 27/0101; G02B 30/26; G02B 2027/013; G02B 30/40; G03B 21/62; G03B 35/20; G03B 37/04
USPC ........................................................ 359/631
See application file for complete search history.

(56) References Cited

U.S. PATENT DOCUMENTS 10,663,724 B1 *   5/2020   Laduke   ................. G02B 30/40

* cited by examiner

*Primary Examiner* — James C. Jones
(74) *Attorney, Agent, or Firm* — Snell & Wilmer L.L.P.; Kent A. Lembke

(57) ABSTRACT

A display system for creating a multiplane display. The display system includes a viewing space for viewers. The display system includes a convex screen and a mirror element spaced apart from the convex screen to provide a collimated display. The mirror element is both reflective and transmissive of light, and a fraction of light from the convex screen that strikes a front concave surface of the mirror element is reflected into the viewing space. The convex screen and the front concave surface of the mirror element are each shaped to have an optical prescription defined for a collimated display whereby light reflected into the viewing space is collimated to provide variable depth imagery. The display system includes a background space behind the mirror element, and light from the background space from projection screens and illuminated objects is transmitted through the mirror element to viewers in the viewing space.

20 Claims, 5 Drawing Sheets

PANORAMIC, MULTIPLANE, AND TRANSPARENT COLLIMATED DISPLAY SYSTEM

REFERENCE TO RELATED APPLICATIONS

This application is a continuation of U.S. patent application Ser. No. 16/117,196, filed on Aug. 30, 2018, which is incorporated herein in its entirety by reference.

BACKGROUND

1. Field of the Description

The present description relates, in general, to display systems adapted for stereoscopic or three-dimensional (3D) image generation, and, more particularly, to systems and methods for producing 3D images or depth and space media illusions without requiring viewers to wear 3D glasses or other eyewear using a new collimated display design. These display systems may be considered multiplane or multilayer display systems providing a 3D display to viewers by displaying images that appear to be in two or more planes along the z-axis, and the display systems can be panoramic in that they can be designed to provide the 3D display "in the round" such as with 3D imagery provided at 45 to 360 degrees about a viewing space (e.g., a circular room or space where a viewer would be located when enjoying the 3D show or experience without a fixed viewing direction).

2. Relevant Background

There is a growing demand for displays that include 3D imagery. For example, there is a growing trend toward using 3D projection techniques in theatres and in-home entertainment systems including video games and computer-based displays. In many conventional 3D projection techniques, the right eye and the left eye images are delivered separately to display the same scene or images from separate perspectives so that a viewer sees a three-dimensional composite, e.g., certain characters or objects appear nearer than the screen and other appear farther away than the screen. Stereoscopy, stereoscopic imaging, and 3D imaging are labels for any technique capable of creating the illusion of depth in an image. Often, the illusion of depth in a photograph, movie, or other two-dimensional image is created by presenting a slightly different image to each eye or the creation of parallax. In most animated 3D projection systems, depth perception in the brain is achieved by providing two different images to the viewer's eyes representing two perspectives of the same object with a minor deviation similar to the perspectives that both eyes naturally receive in binocular vision.

The images or image frames used to produce such a 3D output are often called stereoscopic images or a stereoscopic image stream because the 3D effect is due to stereoscopic perception by the viewer. A frame is a single image at a specific point in time, and motion or animation is achieved by showing many frames per second (fps) such as 24 to 30 fps. The frames may include images or content from a live action movie filmed with two cameras or a rendered animation that is imaged or filmed with two camera locations. Stereoscopic perception results from the presentation of two horizontally offset images or frames with one or more object slightly offset to the viewer's left and right eyes, e.g., a left eye image stream and a right eye image stream of the same object. The amount of offset between the elements of left and right eye images determines the depth at which the elements are perceived in the resulting stereo image. An object appears to protrude toward the observer and away from the neutral plane or screen when the position or coordinates of the left eye image are crossed with those of the right eye image (e.g., negative parallax). In contrast, an object appears to recede or be behind the screen when the position or coordinates of the left eye image and the right image are not crossed (e.g., a positive parallax results).

Many techniques have been devised and developed for projecting stereoscopic images to achieve a 3D effect. One technique is to provide left and right eye images for a single, offset two-dimensional image and displaying them alternately, e.g., using 3D switching or similar devices. A viewer is provided with liquid crystal shuttered spectacles to view the left and the right eye images. The shuttered spectacles are synchronized with the display signal to admit a corresponding image one eye at a time. More specifically, the shutter for the right eye is opened when the right eye image is displayed and the liquid crystal shutter for the left eye is opened when the left eye image is displayed. In this way, the observer's brain merges or fuses the left and right eye images to create the perception of depth.

Another technique for providing stereoscopic viewing is the use of anaglyphs. An anaglyph is an image generally consisting of two distinctly colored, and preferably, complementary colored, images. The theory of anaglyph is the same as the technique described above in which the observer is provided separate left and right eye images, and the horizontal offset in the images provides the illusion of depth. The observer views the anaglyph consisting of two images of the same object in two different colors, such as red and blue-green, and shifted horizontally. The observer wearing anaglyph spectacles views the images through lenses of matching colors. In this manner, the observer sees, for example, only the blue-green tinted image with the blue-green lens, and only the red tinted image with the red lens, thus providing separate images to each eye. The advantages of this implementation are that the cost of anaglyph spectacles is lower than that of liquid crystal shuttered spectacles and there is no need for providing an external signal to synchronize the anaglyph spectacles.

In other 3D projection systems, the viewer may be provided glasses with appropriate polarizing filters such that the alternating right-left eye images are seen with the appropriate eye based on the displayed stereoscopic images having appropriate polarization (two images are superimposed on a screen, such as a silver screen to preserve polarization, through orthogonal polarizing filters). Other devices have been produced in which the images are provided to the viewer concurrently with a right eye image stream provided to the right eye and a left eye image stream provided to the left eye. Still other devices produce an auto-stereoscopic display via stereoscopic conversion from an input color image and a disparity map, which typically is created based on offset right and left eye images. While these display or projection systems may differ, each typically requires a stereographic image as input in which a left eye image and a slightly offset right eye image of a single scene from offset cameras or differing perspectives are provided to create a presentation with the appearance of depth.

There is a continuous desire and need to provide new techniques that provide cost effective but eye-catching content with depth and dimension. For example, it is desirable to grab the attention of crowds in shopping malls, on busy streets, in amusement parks, and other crowded facilities such as airports and entertainment arenas, and there is an ongoing demand to improve 3D imagery in other settings including education, medicine, and gaming. As discussed above, 3D projection is one exciting way to appeal to viewers and hold their attention. However, the use of 3D projection has, in the past, been limited by a number of issues. Typically, 3D projection is used only in low light environments and is not particularly effective in applications where there is a significant amount of ambient light such as an outdoor venue during the daytime (e.g., an amusement park or athletic stadium in the morning or afternoon where conventional 3D video image projection cannot compete with sunlight). Further, 3D projection technologies generally require the viewer to wear special viewing glasses, which is often inconvenient for many applications and can significantly add to costs.

Hence, there remains a need and desire to provide new and unique depth-based or 3D experiences that eliminate the need for 3D glasses and 3D projection technologies. Further, there is a demand to provide 3D imagery to a viewer in more than one viewing direction so that the viewer can move about a viewing space (or at least turn their head) and be able to perceive 3D images all about them or "in the round."

SUMMARY

The inventors recognized that the technology behind collimated displays may be useful in a 3D display system to both provide 3D imagery via multiplane images and a panoramic 3D experience, but only with significant modifications of conventional collimated displays to create a new collimated display assembly.

Before the inventors' work, collimated displays were used for simulation and training. The prior collimated displays incorporated opaque glass mirrors or formed metalized (i.e., opaque) polyester (e.g., a metallized polyethylene terephthalate (PET) film) substrates to create infinity optics. In the cases of PET films, they are drawn down under vacuum to create the optical prescription used to create collimation in reflection. The metalized coating used on the PET film provides the reflector or reflective surface of the collimated display and is functionally opaque. In large simulation displays or simulators (e.g., flight simulators), limiting factors in their use and design is material size (e.g., width) and weight. Many of these simulators are mounted to six degree-of-freedom (6DOF) motion bases so weight is very critical. Glass mirrors are heavy, expensive to fabricate, and require seams that are visible to the viewer. PET, vacuum-drawn, metalized mirrors or reflectors are lightweight but are typically limited to about ten feet in height and width, which limits the vertical field of view of the display in some cases.

To provide a multiplane display with a collimated display assembly, the collimated display assembly of the present description includes a mirror element (or reflector) that is both reflective and transmissive of light. This is in direct contrast to the reflectors of prior collimated displays that were all opaque. The new collimated display assembly may be labeled "transparent" because in proper configurations and lighting environments the mirror element will appear transparent to a viewer while it is actually being used to reflect light from a projection screen (or reflective display element that may, in some non-limiting examples, take the form of a conventional front projection screen or surface with a matte finish that defines its gain) to provide imagery that can be designed to appear to be on nearly any plane along the z-axis relative to a viewing space and viewers in that viewing space. The projection screen (or reflective display element) and the mirror element's front surface have matching optical prescriptions (e.g., a shape that defines optical power) such that they work in combination (or as a collimated display assembly) to provide collimation of light delivered into a viewing space, which can be partially or wholly surrounded or enclosed by the front surface of the mirror element.

Because the mirror element is transmissive, a visible volumetric display (or backdrop) space can be provided in the display system behind the mirror element. In one embodiment, a projection screen or wall was provided a predefined distance from the back surface of the mirror element, and a projector(s) was used to project images on this projection screen/wall that were concurrently visible to a viewer with the images reflected from the mirror element's front surface but on a different plane (or at a different depth). The display system design creates a physically deep, multilayer or multiplane display environment that enjoys the optical collimation and viewer eye point accommodation of a classic collimated display.

In one embodiment, the mirror element was provided using optically clear polyester film, e.g., a PET film with reflectance in the range of 5 to 10 percent (and with transmissivity in the corresponding range of 95 to 90 percent). However, it is envisioned that the mirror element may have higher percentages of reflectance (and, hence, less transmissivity) such as in the range of 10 to 50 percent or the like. In contrast to flight simulators with collimated displays, the display systems described herein are not restricted to motion base requirements or by weight. In this regard, the display system may include a static, location-based viewer environment (or viewing space) created for entertainment applications and other uses. Specifically, the mirror elements of the collimated display assembly may be used to provide viewing windows enclosing all or part of the viewing space, and these viewing windows allow for simulation that encompasses very deep physical environments when combined with projection walls/screens or other display devices in the visible volumetric space behind the back surface of the mirror element(s). The clear, polyester mirror may be formed by being drawn by vacuum to the proper optical prescription such as one that matches that of the reflective display or projection screen positioned above the viewing space (e.g., to be out of sight of viewers in the viewing space) to reflect light onto the front surface of the transparent mirror element.

The display system also includes a media display system such as one with one-to-many projectors provided about the periphery of the circular (or semi-circular) projection screen (or reflective display). The media display system may be designed to provide a high resolution and a high brightness image onto the projection screen. The image from the media display system is directed via the projection screen toward the front surface of the mirror element. The mirror element reflects the typically high-resolution image into the viewing space, and, in this way, the mirror element acts similar to the opaque reflectors of conventional collimation displays. However, since the mirror element is "transparent" (e.g., is transmissive as well as reflective), the viewer is also able to concurrently see any images displayed or physical objects in the volumetric display space via light that is transmitted from this space through the mirror element into the viewing space.

In some embodiments, the projection screen (or reflective display) is replaced with a display element that provides the image to the front surface of the mirror element, and, in such embodiments, the display element or device may take the form of a compound organic light-emitting diode (OLED) or liquid crystal display (LCD) flat panel or a fine pitch direct view LED display as the imaging source. In other cases, the display element can be a front or rear projected curved screen using, for example, a high definition projector. In either case, the display element typically will have an optical prescription corresponding with the front surface of the mirror element so that light reflected by the mirror element has proper collimation.

More particularly, a display system is provided for creating a multiplane or autostereoscopic 3D display. The display system includes a viewing space in which viewers may be positioned. The display system also includes a convex screen and a mirror element spaced apart from the convex screen that may be considered a collimated display assembly. The mirror element is both reflective and transmissive of light (e.g., is transparent to translucent), and a fraction of light from the convex screen that strikes a front concave surface of the mirror element is reflected into the viewing space. Further, the convex screen and the front concave surface of the mirror element are each shaped to have an optical prescription defined for a collimated display whereby the fraction of light reflected into the viewing space is collimated. The display system also includes a background space behind the mirror element, and light from the background space is transmitted through the mirror element for concurrent viewing in the viewing space with the fraction of light reflected into the viewing space by the "transparent" mirror element.

In some embodiments, the mirror element includes a film of polyester or a sheet of formed glass. The mirror element may have a reflectance in the range of 5 to 50 percent with some implementations using materials providing a reflectance in the range of 5 to 10 percent. It may be useful in some implementation for the mirror element to be formed of a film of optically clear polyester (e.g., Clear Mylar® or the like), and the front concave surface is shaped (such as by drawing it down onto a frame under vacuum) to be horizontally and vertically concave to provide the optical prescription of the collimated display. To assist in proper shaping, the film of optically clear polyester can be chosen to have a thickness in the range of 0.5 to 2 mils.

The display system may be configured for "in the round" displays. To this end, the convex screen and the mirror element may both have semi-circular or circular cross-sectional shape with coinciding central axes that extend in the range of 45 to 360 degrees about the central axes. In some cases, the convex screen is a front or rear projection screen, and the display system further includes a video projector projecting onto the convex screen to provide images in the collimated light directed into the viewing space. In other cases, though, the convex screen includes a screen of a display device (e.g., an LCD, OLED, or other display device or element including, but not limited to, a fine pitch LED display such as those used in large tiled arrays (e.g., a FLEXmod Adaptive LED Tile available from PixelFLEX, Tennessee, USA or the like)) bent in two directions (e.g., horizontally and vertically) to provide the optical prescription of the collimated display. In either of these cases, the light from the convex screen can be configured (e.g., by what media is delivered to the display device or video projector) to provide one or more images viewable by a viewer in the viewing space, and the one or more images are modified over time to appear to be located on two or more planes along the z-axis to the viewer.

In some embodiments, the display system includes a projection wall positioned in the background space with a front or rear projection screen facing a back surface of the mirror element, and light from the front or rear projection screen is transmitted through the mirror element into the viewing space concurrently with the reflection of light from the convex screen by the front concave surface of the mirror element, which furthers the depth effect or multiplane/multilayer effect of the display system. Further, in this regard, the display system may include at least one physical object or character positioned in the background space and a light source illuminating one or more surfaces of the at least one physical object or character such that light from the one or more surfaces is directed through the mirror element. Additionally, the display system may include a collimated display positioned in the background space providing collimated light that is transmitted through the "transparent" mirror element into the viewing space.

DETAILED DESCRIPTION

Figure 1:
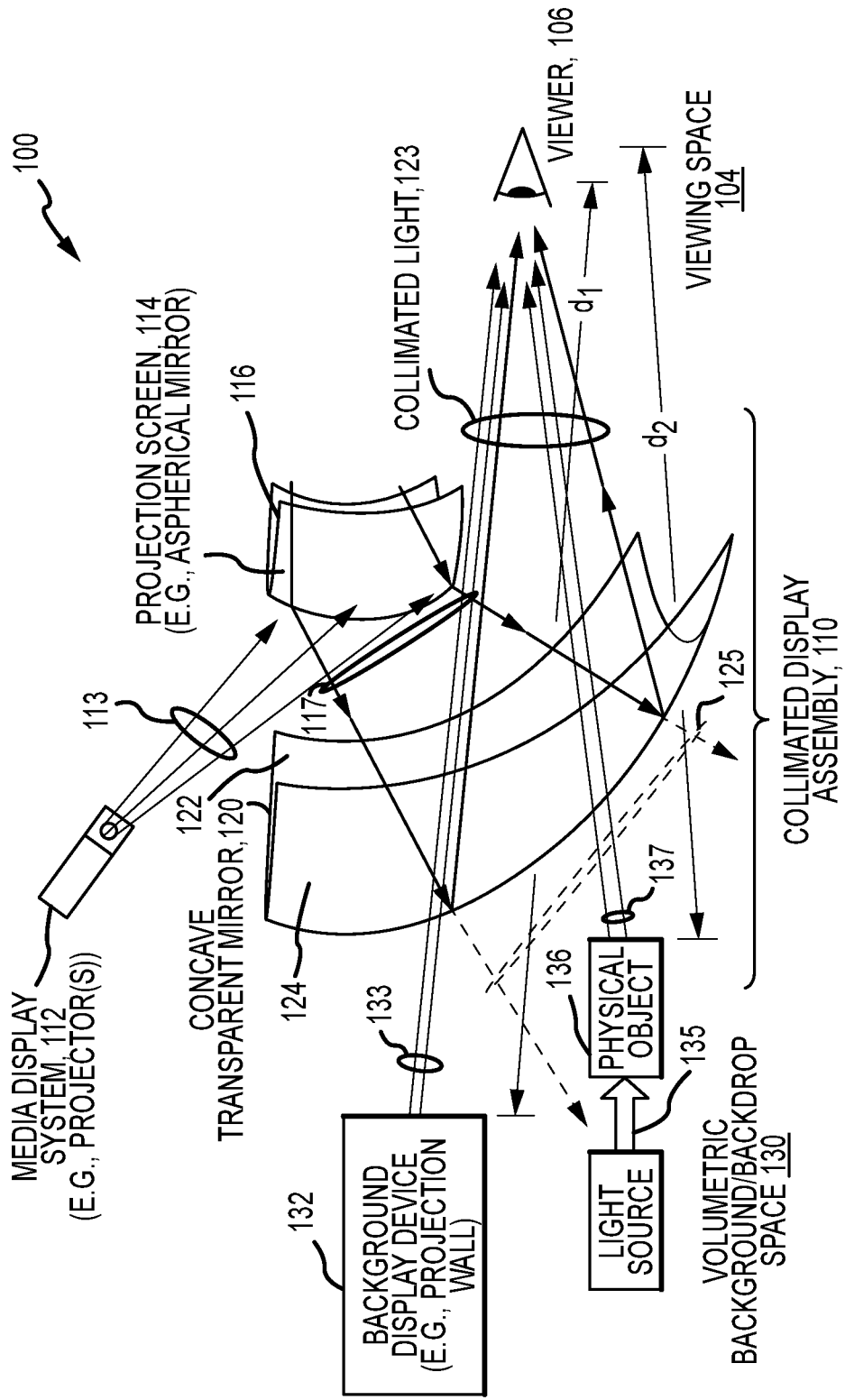
FIG. 1 is a schematic or functional block diagram of a multiplane or 3D display system of the present description.

Briefly, embodiments described herein are directed toward three-dimensional (3D) display devices or systems that are autostereoscopic, as a viewer may perceive depth or the 3D effects in the displayed image without the use of 3D glasses or eyewear (e.g., no need for colored or switching lenses or the like). The display systems of the present description each include a collimated display assembly that differs from prior collimated displays at least because it makes use of a mirror element that is both transmissive and reflective rather than being opaque. The mirror element often has such low reflectance that it may be considered "transparent" such as with reflectance below 50 percent and often in the range of 5 to 15 percent. The mirror element has a concave reflective surface that faces a viewing space and also a projection screen with a convex reflective surface so that it reflects light directed from the projection screen (e.g., images from a projector or other media source) into the viewing space and to any viewers located in this space.

The mirror element and the projection screen are configured with optical prescriptions such that the reflected light from the mirror element's concave reflective surface is collimated light. To further the depth effect or illusion, the display system includes a volumetric background/backdrop space behind the mirror element that includes one or more background display devices (e.g., a projection wall) and/or physical objects or set pieces illuminated by one or more light sources, and, due to the mirror element being transmissive, the viewer in the viewing space is able to observe these background displays and/or objects concurrently with the images provided in the reflected collimated light. In other or the same embodiments, this background/backdrop space may include or be replaced with another collimated display set up, either solid or reflective and transmissive like the first layer. The mirror element may wrap around the periphery of the viewing space along with the volumetric background space and projection screen to provide a large range of viewing angles such as 45 to 360 degrees. The media displayed on the projection screen may be varied over time such as in size to appear to the viewer to be in a plurality of planes along the z-axis so images appear to be at differing distances from the viewer (have varying depth). In this manner, the display system is operable to provide an "in the round" multiplane or multilayer 3D visual experience with variable depth, and, in this regard, the use of the transparent mirror element combined with the visible volumetric background space leads one to consider the display system a variable depth Pepper's Ghost device.

The inventors recognized the significant advantage of using the optical prescriptions and technology of collimated displays to provide collimated light to a viewer but modifying the mirror element to be transparent-to-translucent (e.g., 50 percent or less reflectance with some embodiments using materials that are less than about 20 percent reflective such as in the range of 5 to 10 percent reflective, which may be considered optically clear) rather than opaque (e.g., conventional metalized PET mirrors of collimated displays). Prior collimated displays with opaque mirrors also had issues with segmented mirrors that include seams that are visible. Instead, a large width (e.g., one with a width of at least 10 feet and/or one that wraps 45 to 360 degrees about a viewing space) transparent mirror element can be provided using a single piece of transmissive materials such as a polyester film (such as Clear Mylar®, a transparent (e.g., ultra clear transparent) PVC film (which may offer better flexibility when pulled under vacuum but lack some of the optical clarity of PET-based films such as Clear Mylar® while still being inherently flame retardant), or the like). This material is formed (such as by shaping under vacuum) into a mirror element with horizontal and vertical concavity with an optical prescription corresponding with a projection screen with a mirror surface (that is a section of a hemisphere) facing and spaced apart from the concave "front" surface of the mirror element. In this regard, it is often preferable to use relatively thin films such as those in the range of 0.5 to 2 mils or the like to be shaped accurately to correct optical prescription to reflect collimated light (as the mirror surface normalizes and magnifies light from paired convex projection screen/reflective display).

FIG. 1 illustrates a 3D display system 100 that may be operated as shown to provide a multiplane, autostereoscopic display experience for a viewer 106 positioned in a viewing space 104. The system 100 includes a collimated display assembly 110 that includes a media display system 112 that may include one or more devices for providing light 113 with 2D or 3D imagery (but typically not stereo), and the system 112 may include one, two, three, or more video projectors that may be chosen to be high resolution and/or high brightness (such as 8000 to 25000 or more lumen ratings). The media light 113 is directed toward a projection screen 114 where it strikes a reflective surface 116 that is generally convex and may be a mirror with an optical prescription paired with that of mirror element 120 (e.g., a mirror shaped as a section of a hemisphere).

As shown, the mirror element 120 is a concave transparent mirror formed of a material that is both transmissive and reflective and with its concave reflective front surface 122 facing the convex reflective surface 116 of the projection screen 114. The light 117 reflected from the projection screen 114 is directed onto the front surface 122 where a fraction (e.g., 5 to 10 percent or more) is reflected as light 123 that is directed into the viewing space 104 and toward viewer 106. The surface 122 is shaped to be concave in both the vertical and horizontal directions with an optical prescription corresponding to that of surface 116 so that the light 123 is collimated light (for both the horizontal and vertical directions), which forces the viewer 106 to focus to infinity. The distance between the surface 116 and the surface 122 (and relative orientations) is selected to suit the size and/or optical prescriptions of the two surfaces 116 and 122 to achieve the desired collimation of light 123 reflected from the front surface 122. The mirror element 120 may be formed of nearly any material with desired percentages of reflectance and transmissivity such as formed glass. However, some preferred embodiments of system 100 utilize an optically clear polyester film (such as clear PET film or the like) that is shaped (such as by drawing it under vacuum into a frame) to have its front surface be concave with the desired optical prescription to reflect and collimate the received light 117 as shown at 123.

Since the mirror element 120 is also transmissive to light, a fraction of the light 117 that strikes the mirror element 120 is transmitted, as shown with arrows 125, through the element 120 and out via back surface 124 to a volumetric background/backdrop space 130 behind the mirror element 120. Also, since the mirror element 120 is "transparent," light from the space 130 is transmitted through the mirror element 120 into the viewing space 104 where it can be concurrently perceived by the viewer 106 with the collimated light 123 and any imagery it contains. The display system 100 includes one or more background display devices 132 that display images on one or more of their surfaces, and light 133 from these surfaces is transmitted from the space 130 to strike the back surface 124 of the mirror element 120. The light 133 passes through the transmissive material of the element 120 and then into the viewing space 104 and to viewer 106. In some embodiments, the device 132 is a projection screen/wall that is projected upon (front or rear projection) by a projector.

Images displayed upon the surfaces of the device 132 appear to the viewer 106 to be at a depth or distance, $d_1$ (i.e., distance between surfaces of device 132 and present location of viewer 106 in the space 104). The imagery provided by the collimated display assembly 110 can be designed to appear at any plane along the z-axis between the viewer 106 and the surfaces of the background display device and their location may be varied over time so that the images appear to move toward or away from the viewer 106. Additionally, the display system 100 may include one or more physical objects or props (or set pieces) 136, and one or more light sources 134 may be operated to illuminate surfaces of the object 136 with light 135. Reflected light 137 from the surfaces of the object 136 is transmitted through the transparent mirror element 120 and into the viewing space 104 so that the viewer 106 perceives the object 136 at a distance, $d_2$, from their current location in the viewing space. The distance, $d_2$, may be chosen to differ from the distance, $d_1$, to the display device's surfaces to further enhance the depth effect of the system 100.

Figure 2:
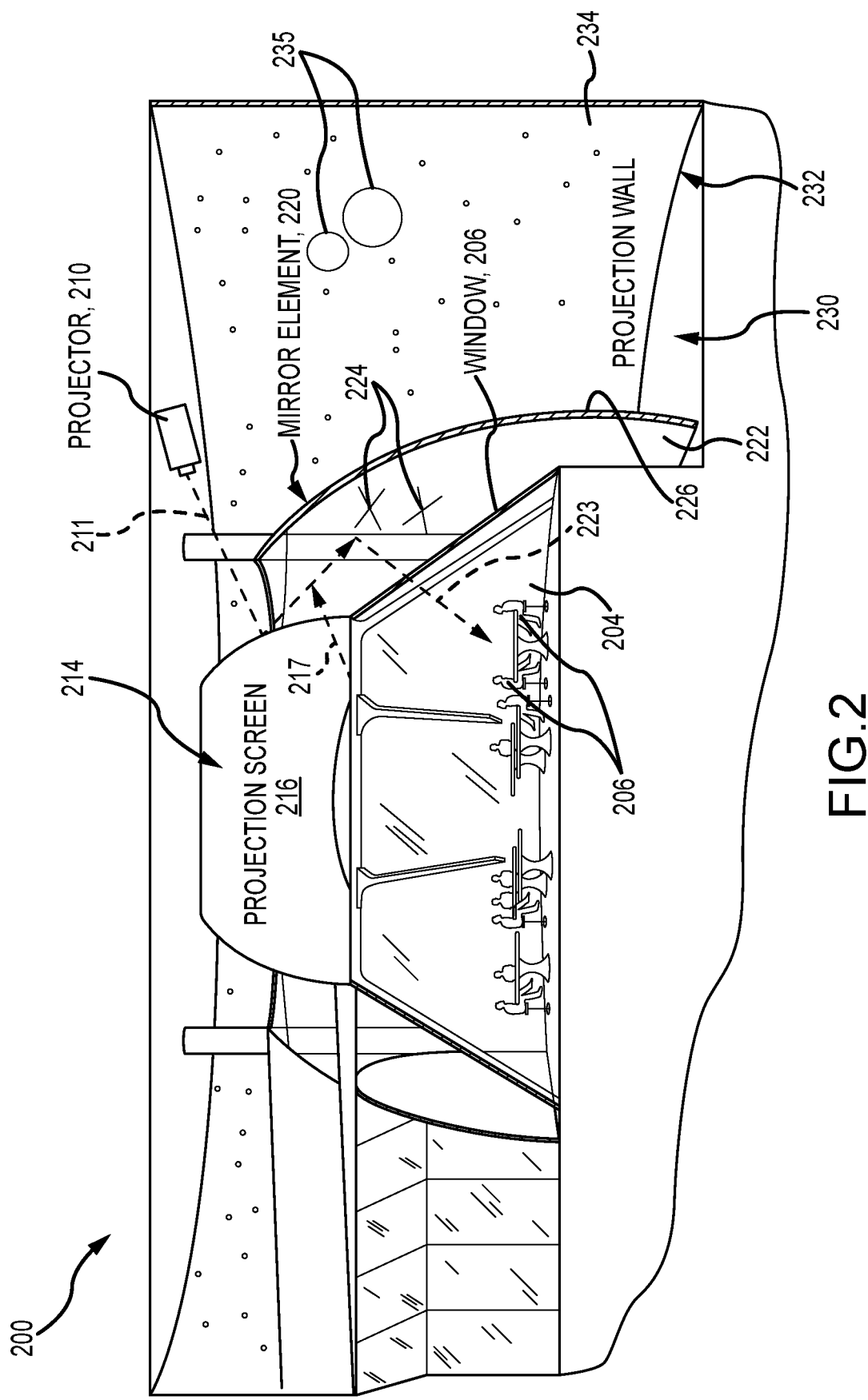
FIG. 2 is a sectional view of a large-scale implementation of a display system using the collimated display technology described herein.

The concepts of a collimated display system that makes use of a "transparent" mirror element shown in FIG. 1 can be scaled upward to a relatively large display system that can provide viewing "in the round." FIG. 2 illustrates a sectional view of a large version of a display system 200 that may be used to provide numerous people or viewers 206 in a display space 204 a 3D viewing experience, and the viewing space 204 may be a portion of a restaurant, an immersive entertainment environment, or the like. As shown, the viewing space 204 is enclosed or defined with a set of windows 206, which may be formed of nearly any clear material such as glass, and the windows 206 are an optional feature of the system 200 that are used in part to keep the viewers 206 from touching other system components (such as the reflective surface 222 of the mirror element 220) and are not included for functions related to providing a 3D display or visual experience.

As shown, the system 200 includes a video projector 210 (i.e., to provide the functions of the media display system 112 of FIG. 1) that operates to project still or video imagery via projected light 211. Typically, the system 200 will include one, two, three, or more additional projectors 210 or display devices to provide high quality and high brightness lighting to all of the reflective surface 216 of a projection screen 214. The projection screen 214 is shown to be positioned above the center of the viewing space 204 such as with a center axis of the space 204 (which may be circular or semi-circular in shape) coinciding with a center axis of the semi-spherically shaped projection screen 214. In other embodiments, though, the screen 214 (and projectors 210) may be positioned below the flooring defining the lower surfaces of the space 204.

As described for projection screen 114 of FIG. 1, the projection screen 214 provides a component of a collimated display assembly and has a reflective surface 216 that is convex with a shape (e.g., a semi-hemispherical shape) having an optical prescription suited for a collimated display. The surface 216 in this embodiment extends wholly (i.e., 360 degrees) about a central axis to take on a large toroid shape. In other embodiments, though, the surface 216 may extend to a smaller amount such as in the range of 45 to 360 degrees. The use a toroid shaped reflective surface 216 allows the collimated display assembly to generate imagery for viewing in any direction in the viewing space 204 (e.g., a viewer 206 may have a viewing angle from 0 to 360 degrees).

As another piece of the collimated assembly, the system 200 includes a mirror element 220 that extends about the periphery of the viewing space 204. The mirror element 220 is formed of a material that is both reflective and transmissive of light such as a clear-to-translucent polyester film, formed glass or plastic, and the like. The mirror element 220 is also generally toroidal or semi-spherical in shape and its central axis coincides with that of the projection screen 214. The mirror element 220 includes a front reflective surface 222 that is concave in both the horizontal and vertical directions with a shape providing it an optical prescription that when paired with that of the reflective surface 216 of the projection screen 214 enables it to output collimated light.

Particularly, light 217 that is reflected from the reflective surface 216 is directed onto the concave front surface 222 of the mirror element 220. A fraction (e.g., 5 to 10 percent or more) of the light 217 is reflected as shown with arrow 223 into the viewing space 204 as collimated light. As a result, the viewers 206 can perceive images 224 in a plane at nearly any point (any depth) along the z-axis. In this example, the images 224 are shown to appear to be located between the window 206 and the front surface 222 of the mirror element 220, but they may also be generated (via media supplied to projector 210) to appear at some distance behind a back surface 226 of the mirror element 220.

In contrast to conventional Pepper's Ghost displays, the depth at which the images 224 appear to be located is not static or limited by a location of the projection screen 214, but, instead, the images 224 are provided by collimated light 223 so that they can have variable depth or a depth that can be changed over time. The mirror element 220 may be quite large without seams (or with minimal seams) such as with a height in the range of 6 to 10 feet or more and with a diameter of 10 to 50 feet or more. To facilitate fabrication of such a large mirror element 220, it may be useful to fabricate it from an optically clear (or translucent in some cases) polyester film (e.g., Clear Mylar® or Type A Mylar® or the like), and the shape with the optical prescription for collimation of light 206 may be created by drawing it down onto framing elements under vacuum. As with the projection screen 214, the mirror element 220 may extend wholly or some fraction of a circumference to enclose the viewing space 204 such as 45 to 180 degrees (as shown in FIG. 2) up to 360 degrees.

To further the depth effect, the display system 200 includes a volumetric background/backdrop space 230 behind the back surface 226 of the mirror element. The volumetric background space 230 is visible to the viewers 206 in the viewing space 204 under proper lighting conditions through the mirror element 220, which is at least translucent to light and more typically optically clear. As shown, a projection wall 232 is provided in the space 230 a distance (e.g., 2 to 20 feet or more) from the back surface 226 of the mirror element 220. The projection wall 232 may be belt or hoop shaped as shown and extend about the entire length or circumference of the mirror element 220 or some fraction of this length/circumference. One projection wall 232 may be used as shown or two, three, or more projection walls 232 may be used as desired. The display system 200 may also include one or more physical objects (props, set pieces, characters/actors (human or robotic), and the like) positioned between the mirror element 220 and the projection wall 232 (which is opaque in many cases).

The projection wall 232 may be provided via a front or rear projection screen in some cases along with one or more video projectors (not shown in FIG. 2). Light reflected or transmitted from the front surface 234 of the wall 232 passes through the mirror element 220 so that the viewers 206 in the viewing space 204 can view images 235 that have depth as they appear at the location of the surface 234. The images 235 are concurrently visible to the viewers 206 with the images 224 provided by collimated light 206 to enhance the depth effect provided by either of the images 224, 235 (e.g., the images 235 appear to be further away from the viewers 206 than the images 224). Special effects can be achieved by balancing the lighting levels on both sides of the mirror element 220 and/or by carefully choosing and/or generating the images 224, 235 (e.g., only use brighter colors for image 224 and keeping space 230 relatively dark to avoid washing out the reflected images 224 from surface 222).

Figure 3:
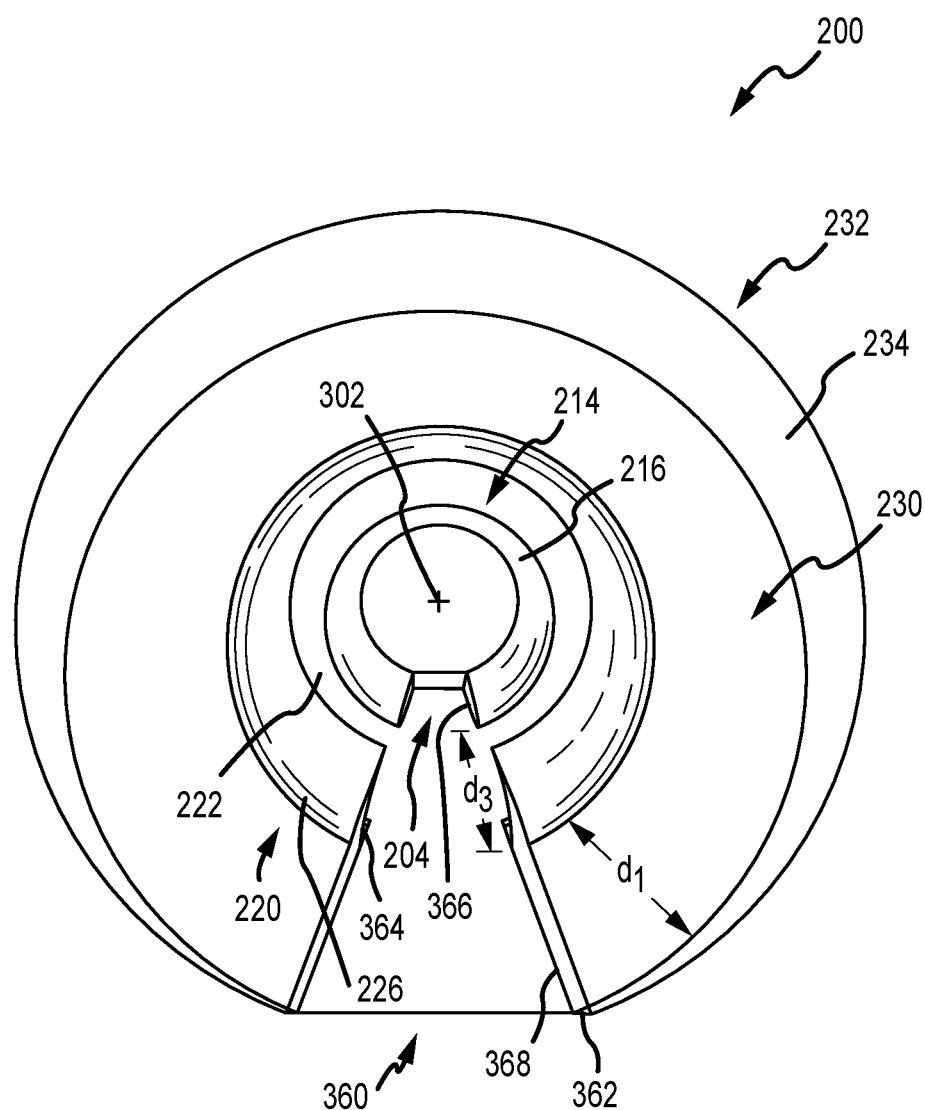
FIGS. 3 and 4 are top perspective views of the display system of FIG. 2.
Figure 4:
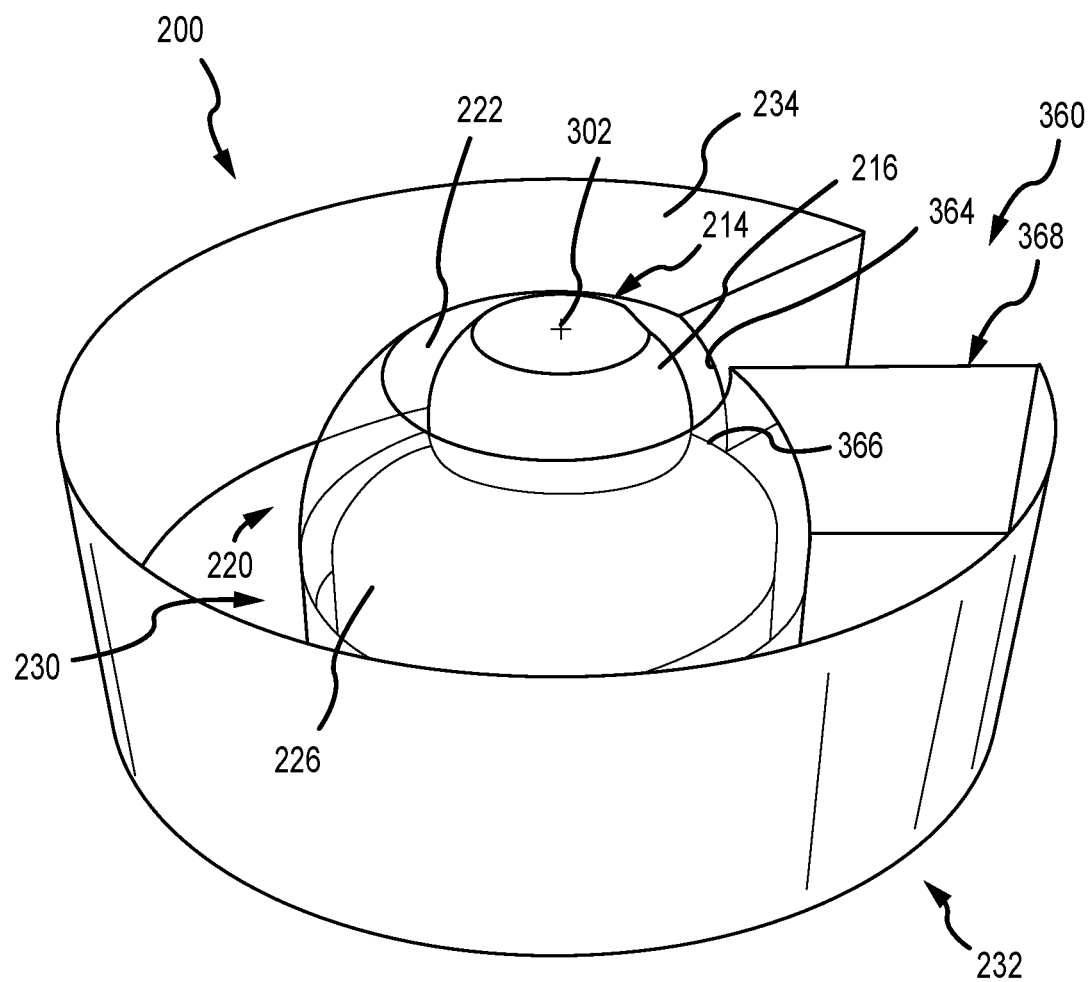

FIGS. 3 and 4 illustrate the display system 200 from a top perspective view. As shown, an entrance or entry/exit space 360 is provided in the display system 200. This is achieved by extending the projection wall 232 and the mirror element 220 some amount less than 360 degrees about the central axis of the three components projection screen 214, mirror element 220, and projection wall 232 (labeled 302 in FIG. 3). For example, the projection wall 232 and the mirror element 220 may extend in the range of 315 to 345 degrees about the central axis 302 to provide entrance 360 with hole/gap 362 in the wall 232, hole/gap 364 in the mirror element 220, and a gap/recessed portion 366 in the reflective surface 216 of the projection screen 214 of the collimated display assembly. Structural walls 368 may connect these holes/gaps 362 and 364 define a hallway into and out of the viewing space 204 for viewers (not shown in FIGS. 3 and 4).

The design of display system 200 provides a nearly complete theater "in the round" experience as the viewers in space 204 can change their horizontal viewing angles or POVs in nearly a full circle and still concurrently observe images via the reflected collimated light from the surfaces 222 and via light transmitted or reflected from the inner surface 234 of the projection wall 232 that pass through the transparent-to-translucent mirror element 220. Other designs may provide a full 360-degree experience (or provide one with a smaller extension than shown such as in the range of 45 to 180 degrees or the like about the central axis 302).

Each component 214, 220, and 232 is a concentric shape (a toroidal shape, semi-cylindrical or belt shape, or semispherical shape) about the central axis 302. To achieve a desired normalization and magnification (or collimation) of light from the projection screen 214, the mirror element's front or inner surface 222 is spaced apart from the reflective surface 216 of the projection screen 214 a predefined distance, $d_3$, such as 3 to 15 feet or more in this large-scale implementation of the display system 200.

To provide further depth to the display system 200, the inner or front surface 234 of the projection wall 232 is spaced apart the distance, $d_1$, from the back surface 226 of the mirror element 220. The spacing defines the size of the visible volumetric background space 230 in which additional display devices and/or physical objects (e.g., set pieces or props or characters) may be positioned and illuminated for viewing by viewers in the centrally-located viewing space 204. This distance, $d_1$, may be constant or may be varied to achieve desired depth and/or display effects in the display system 200. The projection wall 232 has a height that typically is at the same or greater than a height of the mirror element 220 so that viewers can see imagery displayed on surface 234 regardless of their vertical viewing angle or POV. The projection wall may be achieved with front or rear projection techniques, but some embodiments of the display system 200 may provide the projection wall 232 using an additional collimated display assembly included in the display system 200 (not shown but understood through the discussion of FIG. 1 and components 210, 214, and 220 of FIGS. 2 and 3).

In FIG. 2, the projection screen 214 was illustrated as using front projection to provide media via a reflective surface with a particular optical prescription to provide collimation of light when combined with convex surface 222 of the mirror element 220. More generally, the projection screen 214 may be a media display with an optically prescriptive screen for use in a collimated display. With this in mind, the projection screen 214 may also be configured as a rear projection screen and the projector(s) 210 of FIG. 2 may be positioned to project light onto a back or rear surface of the surface 216 (which would not have to be a reflective surface but would instead transmit light onto the front surface 222 of the mirror element 220). In still other embodiments of the display system 200, the media display 214 includes one or more display devices or tiles to provide the screen 216 with an optical prescription suited to the surface 222 to provide images via collimated light. For example, the media display 214 may include one or more LEDs, OLEDs, or the like with display screens that are bent into a shape (e.g., into vertical and horizontal curves) to provide the screen 216 with the required optical prescription.

Figure 5:
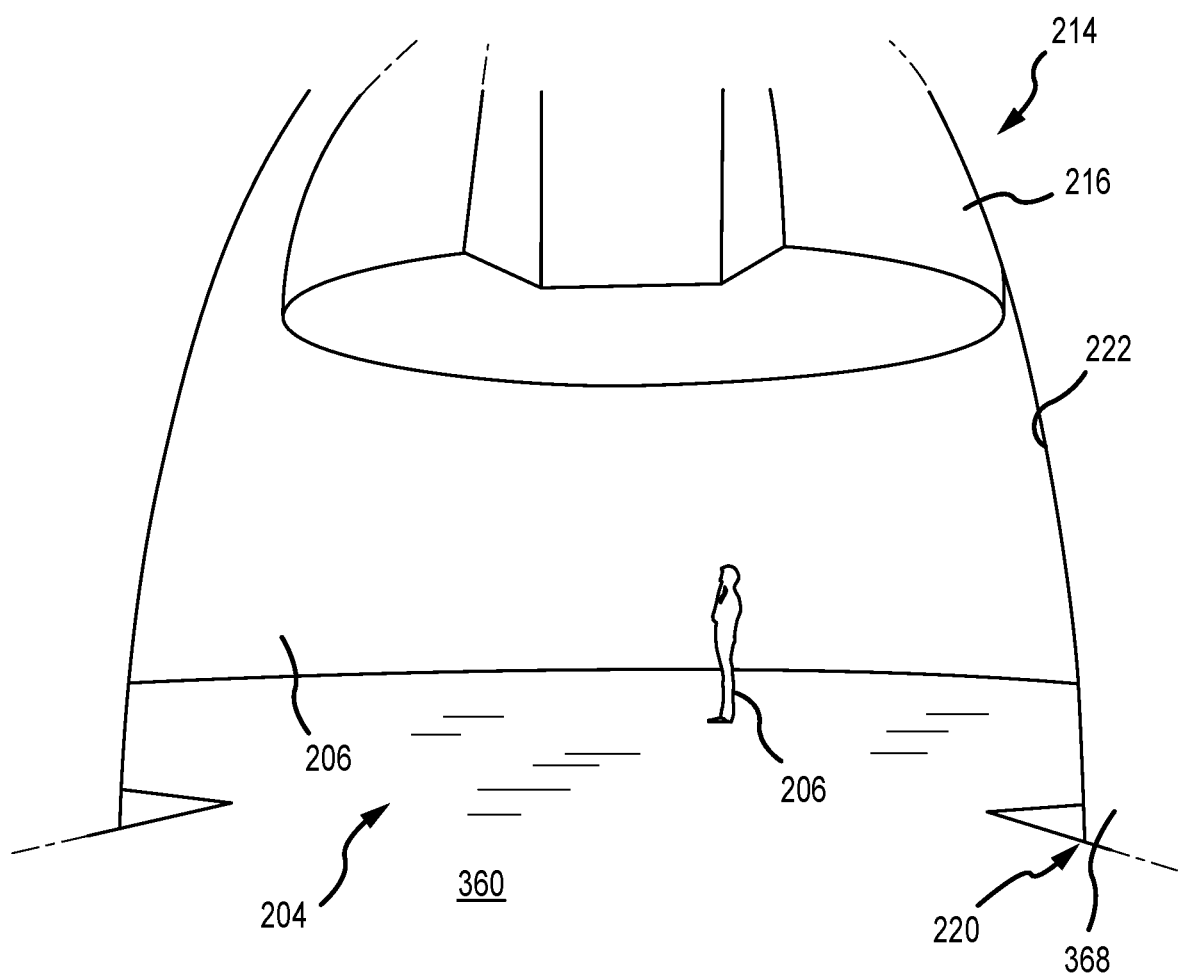
FIG. 5 illustrates a partial view of the display system of FIGS. 2-4 from a vantage point in the entrance to the viewing space.

FIG. 5 illustrates a partial view of the display system of FIGS. 2-4 from a vantage point to show the viewing space 204, e.g., from a location in the entrance 360. As shown, a viewer 206 is located within the viewing space underneath the projection screen/media display 214. During operations of the display system 200, media is displayed upon or reflected off the screen 216, which is convex with a first part of an optical prescription for a collimated display. Light from the screen 216 is directed onto spaced-apart but adjacent front concave surface 222 of the mirror element 220, and this light is partially reflected and partially transmitted. Hence, a fraction of the light from the screen 216 is reflected to the viewer 206 in the viewing space 204 via the clear windows 206. The surface 222 is shaped to provide the second part of the optical prescription for the collimated display such that the fraction of light that is reflected is collimated light, and imagery provided by this collimated light may be configured or designed to appear at nearly any distance from the viewer 206 (or from locations within the viewing space) from several feet up to infinity. Although not shown in FIG. 5, the viewer 206 also is able to concurrently perceive any illuminated objects or screens and/or light from displays in the background space behind the "transparent" mirror element 220.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

The transparent collimation display assembly of the systems taught herein may use lightweight, low-cost polyester membranes to create the 3D illusion. The optically clear polyester material can be purchased in very large web widths (e.g., 25 to 100 feet or more) while metalized polyester is presently only available up to ten feet wide. The availability of wide width clear polyester unlocks the ability to create extremely large collimated environments—as the clear reflector can be wrapped around all or parts of a relatively large viewing space—that are suited to large scale attractions, restaurants, and special event venues. In addition, this clear material for the reflector of the collimated display assembly is available in Underwriters' Laboratories (UL) certified flame-retardant formulations (VTM-0 class UL 94 flame retardant), which may be very desirable for use in many entertainment and other facilities.

An additional advantage of thin polyester films (non-metallized) is that the material is so thin (e.g., 0.5 to 1 mil for transparent standard grade PET film and up to 0.5 to 10 mils for optically clear polyester PET or the like) that it eliminates double reflection due to material thickness. This thin material can be drawn down with a vacuum or pressurized with positive pressure to create the optical prescription required to provide collimation of reflected light. This compound shape—the front surface of the reflector or mirror element is horizontally and vertically concave—can be accurately maintained at the proper shape using sensors and controls that constantly monitor the shape and depth of the material.

The display systems are also unique in their ability to create a truly immersive environment using collimated optics at a huge scale. A key feature in this regard is the use of the clear material as the primary reflector or mirror element of the collimated display assembly. By controlling the shape of its front surface (surface facing the viewing space), the benefit of collimation is obtained in combination with the physical depth of a classic Pepper's Ghost illusion so that the display system may be thought of as a variable depth Pepper's Ghost system (as the reflected image can be generated by the media display system to appear at nearly any depth or at any plane along the z-axis). Unlike a conventional Pepper's Ghost system, the technique described herein forces the human eye to accommodate at infinity. This depth cue causes the brain to accept the reflected imagery at infinity so that the perception of the environment can be controlled. For example, an outer space environment will no longer look like a two-dimensional (2D) display representing an infinite environment.

Included in this advantage is that the physical environment behind the collimation optics (often labeled the visible volumetric display (or backdrop or background) space or assembly) can be physically augmented with scenery and/or projection surfaces (or other display devices) that can be coordinated spatially with digital 2D or 3D rendered media (not stereo so no eyewear required). This includes interactive elements such as laser blasts or similar visual special effects that appear to emanate from the viewer's point of view (POV) and into the environment, which is a unique feature previously only available using stereo techniques that utilized glasses or head-mounted VR/AR hardware.

In the theme park setting, one can foresee a ride system that passes along a viewing path that incorporates the display system in long linear paths allowing the rider to look at infinity with foreground real-time generated content that is interactive. In other settings, a restaurant can provide tables in the viewing space to provide a 360-degree view of outer space with foreground space ships and planets while the galaxies in the background are perceived at infinity. In another example, an underwater experience may be provided that looks and is perceived to be infinitely deep with fish creating a truly digital aquarium. Further, a theatrical experience can be provided with a theater designed to accommodate the display system and its display techniques in a wide field of view for the audience.

We claim:

1. A display system for providing a multiplane display in a viewing space, comprising:
    a convex screen;
    a mirror element spaced apart from the convex screen, wherein the mirror element is reflective and transmissive of light,
    wherein a fraction of light from the convex screen that strikes a front concave surface of the mirror element is reflected into the viewing space, and
    wherein the convex screen and the front concave surface of the mirror element are each shaped to have an optical prescription defined for a collimated display whereby the fraction of light reflected into the viewing space is collimated.

2. The display system of claim 1, wherein the mirror element comprises a film of polyester or a sheet of formed glass or plastic.

3. The display system of claim 1, wherein the mirror element has a reflectance such that the fraction is in the range of 5 to 50 percent.

4. The display system of claim 3, wherein the mirror element is configured such that the fraction is the range of 5 to 10 percent.

5. The display system of claim 1, wherein the mirror element is formed of a film of optically clear polyester with a thickness in the range of 0.5 to 2 mils.

6. The display system of claim 1, wherein the front concave surface is shaped to be horizontally and vertically concave to provide the optical prescription of the collimated display.

7. The display system of claim 1, wherein the convex screen and the mirror element have semi-circular or circular cross-sectional shapes with coinciding central axes and extend in the range of 45 to 360 degrees about the central axes.

8. The display system of claim 1, wherein the convex screen comprises a front or rear projection screen and the display system further includes a video projector projecting onto the convex screen to provide images in the collimated light directed into the viewing space.

9. The display system of claim 1, wherein the convex screen includes a screen of a display device bent in two directions to provide the optical prescription of the collimated display.

10. The display system of claim 1, wherein the light from the convex screen is configured to provide one or more images viewable by a viewer in the viewing space and wherein the one or more images are modified over time to appear to be located on two or more planes along the z-axis to the viewer.

11. The display system of claim 1, further comprising a collimated display providing collimated light that is transmitted through the mirror element into the viewing space.

12. A display system for providing a multiplane display, comprising:
    a media display with a convex screen; and
    a mirror element with a concave front surface facing the convex screen,
    wherein the mirror element is reflective and transmissive of light,
    wherein a fraction of light from the convex screen that strikes the front concave surface of the mirror element is reflected,
    wherein the convex screen and the front concave surface of the mirror element have an optical prescription defined for the collimated display whereby the fraction of light reflected is collimated, and
    wherein the front concave surface of the mirror element is shaped to be horizontally and vertically concave to provide the optical prescription of the collimated display.

13. The display system of claim 12, wherein the mirror element comprises a film of polyester or a sheet of formed glass or plastic and wherein the fraction is less than 20 percent, whereby the mirror element is substantially transparent.

14. The display system of claim 12, wherein the mirror element is formed of a film of optically clear polyester.

15. The display system of claim 12, wherein the convex screen and the mirror element have semi-circular or circular cross-sectional shapes with coinciding central axes and extend in the range of 45 to 360 degrees about the central axes.

16. The display system of claim 12, wherein the convex screen comprises a front or rear projection screen and the display system further includes a video projector projecting onto the convex screen to provide images in the collimated light directed into the viewing space.

17. A display system for providing a multiplane display in a viewing space, comprising:
    a mirror element with a concave front surface that is reflective and transmissive of light, wherein the concave front surface reflects collimated light during operations of the collimated display assembly into the viewing space and wherein light transmitted through the mirror element into the viewing space is viewable in the viewing space concurrently with the reflection of the collimated light by the concave front surface of the mirror element; and
    a media display with a convex screen providing imagery via light output onto the front concave surface of the mirror element, wherein the convex screen and the front concave surface have corresponding optical prescriptions to produce the collimated light, and wherein the mirror element is configured such that a fraction of the light output onto the front concave surface in the range of 5 to 50 percent is reflected by the front concave surface.

18. The display system of claim 17, wherein the mirror element is formed of a film of optically clear polyester.

19. The display system of claim 17, wherein the front concave surface is shaped to be horizontally and vertically concave to provide an optical prescription of the collimated display assembly to provide the collimated light.

20. The display system of claim 17, wherein the mirror element has a semi-circular or circular cross-sectional shape and extends in the range of 45 to 360 degrees about a central axis.

* * * * *